June 23, 1936. G. F. RACKETT 2,044,810
FILM LUBRICATING DEVICE
Original Filed Aug. 20, 1931
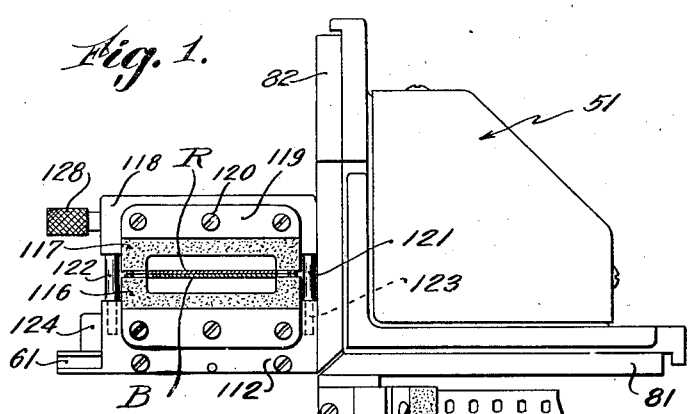
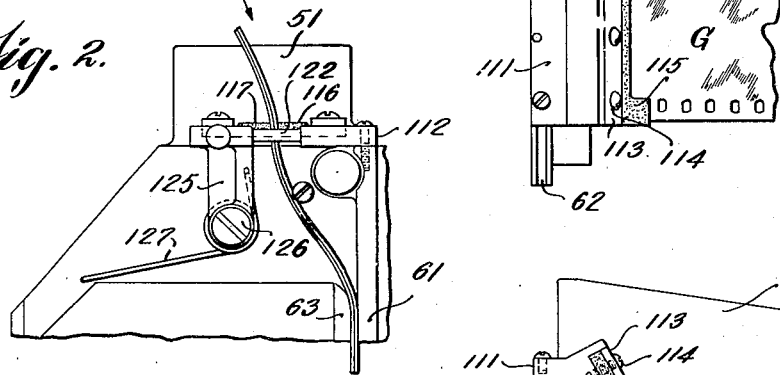
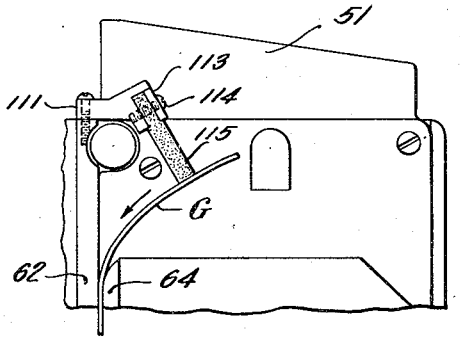
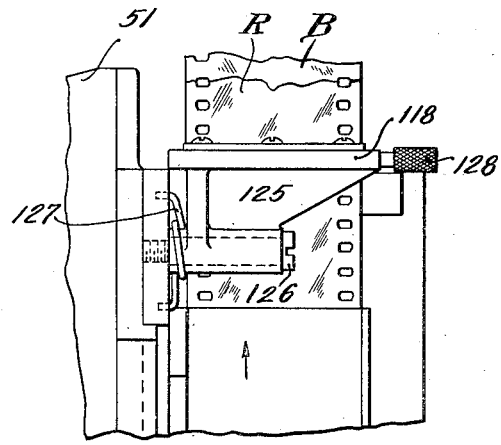
Inventor,
Gerald F. Rackett,
by Roberts, Cushman & Woodberry
Attys.

Patented June 23, 1936

2,044,810

UNITED STATES PATENT OFFICE 2,044,810

FILM LUBRICATING DEVICE

Gerald F. Rackett, Los Angeles, Calif., assignor to Technicolor Motion Picture Corporation, Boston, Mass., a corporation of Maine Original application August 20, 1931, Serial No. 558,193. Divided and this application April 21, 1933, Serial No. 667,233

3 Claims. (Cl. 88—17)

This invention relates to cinematography and more particularly to devices for lubricating films traveling in photographic apparatus, as for example motion picture cameras. The present application is a division of the copending application Serial No. 558,193, filed August 20, 1931.

Objects of the invention are to provide means for lubricating film within a photographic camera, or similar apparatus, in order to enhance its progress therethrough, to provide a simple and yet effective film lubricating device which can be conveniently mounted in the limited space within a photographic camera, and to provide a device of this kind which can be conveniently adjusted and permits easy threading of the film therethrough. In another aspect of my invention, it is one of its objects to provide a device of the type referred to which permits lubrication of superposed films traveling together through cinematographic apparatus.

Other objects and advantages of my invention will be apparent from the following description, by way of example, of a typical embodiment thereof, illustrated by a drawing in which:

Fig. 1 is a plan view of the film movement support of a photographic camera with devices according to the invention mounted thereon;

Fig. 2 is a front elevation viewed from the left of Fig. 1;

Fig. 3 is a side elevation viewed from the top of Fig. 1; and

Fig. 4 is a front elevation viewed from the bottom of Fig. 1.

The herein described embodiment of the invention is shown as incorporated in a camera for taking cinematographic records in natural colors which is described in detail in the above mentioned application Serial No. 558,193, and comprises a central supporting block 51 having flanges 81, 82 upon which film movements (not shown) are mounted, which advance films B, R and G within planes perpendicular to the flanges.

As shown in the drawing, films B and R are superposed and advanced adjacent to flange 82, whereas film G is similarly positioned near flange 81. Each film movement has an aperture plate 61, 62 respectively, and a back plate 63, 64, respectively, between which the films are guided and which extend at right angles from flanges 81, 82 as shown in Fig. 1.

The aperture plates 61 and 62 support the oiling devices according to the present invention which consist substantially of felt pads arranged to touch the films slightly along their perforated margins and apply a slight amount of oil to them as they enter the movements.

Pad holders 111 and 112 (Figs. 1, 2 and 4) are secured to the aperture plates respectively, the holders, with the aid of clamping plates 113 and screws 114, supporting U-shaped felt pads 115 and 116. The aperture containing superposed films requires two oil pads, one for each film, and has therefore in addition an outer pad holder 118 with pad 117 fastened thereto by means of clamp plate 119 and screws 120 (Figs. 1 and 2).

The outer pad holder 118 has an arm 125 journaled on screw pin 126 and forced towards the film by spring 127. This arm can be swung away from the films by means of handle 128 and its proper distance from the film is maintained with the aid of two positioning pins 121 and 122 which screw into holder 112 at 123 and 124 and whose length can be adjusted according to requirements.

The films are threaded through their respective movements in the usual manner, whereupon film G contacts with pad 115 to which a suitable lubricating agent is applied, and is continuously oiled prior to entering its film movement in the direction indicated.

Films R and B are inserted between pads 116 and 117 by lifting pad holder 118, and are then threaded together through the second film movement. Moving in the direction indicated, each film is lubricated along its margins before it enters the movement.

It should be understood that the present disclosure is for the purpose of illustration only and that this invention includes all modifications and equivalents which fall within the scope of the appended claims.

I claim:

1. Motion picture apparatus comprising a film gate with film confining means and a unitary pad of lubricant carrying material placed in the film path before, and independently of said confining means substantially transversely of the film and having two extensions touching and thereby uniformly lubricating the passing film along its margins prior to entering said gate.

2. Motion picture apparatus comprising a film gate with film confining means and a support fixed to said film gate independently of said confining means, a lubricating pad mounted on said support, a second support swingingly associated with said gate, a lubricating pad mounted on said second support, means for distancing the two pads, and means for pressing the supports toward a film progressing intermediate thereof.

3. In a motion picture machine, a film gate having film confining means and a film lubricating device comprising a pad of lubricant carrying material mounted on the film gate independently of said confining means, a carrier with a second pad resiliently connected to the film gate, the two pads having extensions adapted to contact with the margins of films progressing intermediate thereof, and means for adjustably distancing the pads.

GERALD F. RACKETT.